(12) United States Patent
Dom

(10) Patent No.: US 7,434,897 B2
(45) Date of Patent: Oct. 14, 2008

(54) ENDLESS TRACK CONSTRUCTED FROM VEHICLE TIRE

(76) Inventor: Thomas Dom, 6869 E. Vernon Ave., Scottsdale, AZ (US) 85257

( * ) Notice: Subject to any disclaimer, the term of this patent is extended or adjusted under 35 U.S.C. 154(b) by 685 days.

(21) Appl. No.: 10/101,920

(22) Filed: Mar. 20, 2002

(65) Prior Publication Data

US 2002/0190575 A1 Dec. 19, 2002

Related U.S. Application Data

(60) Provisional application No. 60/277,449, filed on Mar. 22, 2001.

(51) Int. Cl.
*B62D 55/00* (2006.01)
*B60B 9/00* (2006.01)

(52) U.S. Cl. .................... 305/165; 305/136; 180/9.34

(58) Field of Classification Search ............ 280/80.1, 280/9.23; 180/9, 236–237, 240, 269, 9.34; 105/26.01; 305/100, 107–108, 110–112, 305/127–128, 130, 136, 165, 195, 60
See application file for complete search history.

(56) References Cited

U.S. PATENT DOCUMENTS

| | | | |
|---|---|---|---|
| 1,298,022 A * | 3/1919 | Dickerson | 305/134 |
| 1,927,680 A * | 9/1933 | Brick | 280/80.1 |
| 1,991,502 A * | 2/1935 | Henneuse | 305/126 |
| 2,348,350 A * | 5/1944 | McKelvey | 152/532 |
| 2,827,972 A * | 3/1958 | West | 180/9.22 |
| 2,982,584 A * | 5/1961 | Uemura | 305/107 |
| 3,239,021 A * | 3/1966 | Harvey | 180/6.7 |
| 3,276,823 A * | 10/1966 | Tucker, Jr. | 305/165 |
| 3,311,424 A * | 3/1967 | Taylor | 305/110 |
| 3,582,154 A * | 6/1971 | Russ, Sr. | 305/166 |
| 3,976,337 A * | 8/1976 | Vaughn | 305/107 |
| 4,134,622 A * | 1/1979 | Krolak et al. | 305/107 |
| 4,198,103 A * | 4/1980 | Ward et al. | 305/165 |
| 4,378,133 A * | 3/1983 | Trautwein | 305/20 |
| 4,410,219 A * | 10/1983 | van der Lely | 305/180 |
| 4,480,670 A * | 11/1984 | Payne | 152/169 |
| 4,600,456 A * | 7/1986 | Oswald | 156/117 |
| 4,671,774 A * | 6/1987 | Owsen | 440/95 |
| 5,005,922 A * | 4/1991 | Edwards et al. | 305/184 |
| 5,388,624 A * | 2/1995 | Nordstrom et al. | 152/185.1 |
| 5,863,104 A * | 1/1999 | Satzler | 305/110 |
| 6,007,166 A * | 12/1999 | Tucker et al. | 305/135 |
| 6,089,684 A * | 7/2000 | Bergstrom et al. | 305/110 |
| 6,203,125 B1 * | 3/2001 | Arakawa et al. | 305/166 |
| 6,296,328 B1 * | 10/2001 | Wilkinson | 305/158 |

* cited by examiner

*Primary Examiner*—Jason R Bellinger

(57) ABSTRACT

Endless tracks constructed from the casing of a vehicle tire by removing the casing sidewalls. The track is installed "as is" over pneumatic tires which are mounted in a frame that allows the axle centerline of the tires to be skewed relative to each other so that the track will run on-center when no side load is present. Guide rollers contact the sides of the track to limit the amount of off-center displacement when a side load is present. A spring loaded wiper is installed so that it contacts the underside of the upper run of the track and removes debris prior to the track feeding onto the front pneumatic tire which applies driving force to the track.

3 Claims, 3 Drawing Sheets

ENDLESS TRACK CONSTRUCTED FROM VEHICLE TIRE

CROSS-REFERENCE TO RELATED APPLICATIONS

Inventor claims benefit of filing date of application No. 60/277,449 dated Mar. 22, 2001

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

Many designs for endless tracks have been used and many others have been proposed ever since the advent of tracked vehicles. The main disadvantage of these designs is the high cost associated with the relatively low production of a complex product. The intent of this invention is to provide a low cost, durable track constructed from a vehicle tire casing, and a method for utilizing this track on a vehicle without the use of complex attachments to the track.

The vehicle tire casing is the main structure of a tire, consisting of the beads, sidewalls, and the rubber under the tread belt. Reinforcing material (usually nylon threads) extends through the entire casing, going from one bead, up through the sidewall, through the rubber under the tread belt, and down through the other sidewall to the other bead. This reinforcing material is arranged in a specific pattern according to the tire application (radial or bias ply). Additional reinforcing materials (usually woven steel belts) are installed in the casing under the tread for added casing protection. These steel belts do not extend into the sidewalls of the casing and end in the crown area (essentially the top of the sidewall).

Most of the tire casings in the scrap tire waste stream are undamaged. They can be reused by removing the old tread belt off of the casing and installing a new tread belt. This is the basic method of re-treading tires and this procedure is common for large truck tires. For economic reasons, tire re-treading is no longer performed on car and light truck tires and these tire casings are discarded when the tread belt becomes worn. These discarded casings can be used to manufacture endless tracks by severing the casing at the top of each sidewall and using the portion of the casing under the tread belt as the endless track. The tread belt may or may not remain on the casing.

2. Description of Related Art

Endless tracks constructed of flexible materials as disclosed in the prior art rely on complex methods to maintain track alignment and provide positive traction force to drive the track. Various types of attachments, protrusions, and grooves have been disclosed that increase the manufacturing and maintenance costs, and decrease the life of the track.

BRIEF SUMMARY OF THE INVENTION

The portion of the tire casing under the tread belt contains the steel reinforcing belts and therefore it is extremely durable. However, this part of the casing also contains a portion of the bead-to-bead nylon reinforcing material and with the sidewalls removed the structural integrity of the tire casing has been reduced. This results in residual internal stresses that make it difficult to use this portion of the casing as an endless track because it will not run true on its supporting wheels. Two simple methods were developed to maintain lateral alignment of the track; supporting wheels with skewed axles and guide rollers that contact the sides of the track.

Testing revealed that skewing the axles of the support wheels resulted in constant lateral alignment of the track. The skewing results in the plane of rotation of the wheels to be oblique to one another. The amount of skewing varies for each tire casing and can only be determined by testing. This method does not maintain track alignment when a severe side load is present, such as occurs when turning a tracked vehicle using differential turning. To correct this, guide rollers were installed that contact the sides of the track and limit its lateral displacement. When the side load is removed, the track returns to its original lateral alignment by virtue of the support wheels with skewed axles.

Since it is the desire of this patent to disclose a low cost method of manufacturing and utilizing a tire casing for an endless track, no type of positive drive attachment on the track is used. This necessitates friction drive for the tracks. Testing has shown that the disclosed endless tracks when used in combination with pneumatic support/drive wheels will easily accommodate and expel almost any dry foreign matter (rocks, dirt, sand, etc.). However, wet material such as mud, snow, and ice adhere to the inner surface of the track and cause the drive wheel to slip. To remove this material a spring loaded scraper was installed. The scraper consists of a flat plate installed in a plane that is perpendicular to the movement of the track. The plate is mounted on a arm that pivots at approximately its center and has a spring attached to the end opposite of the scraper plate. This scraper must be installed so that it cleans the underside of the upper run of the track so that any material that accumulates in front of the scraper will fall to the lower run of the track and be expelled. The scraper cannot be installed on the upper side of the bottom run because the material will accumulate in front of it and will not be expelled. Furthermore, the front wheel must provide the driving force to the track. In this configuration, the scraper cleans the inner surface of the track before if feeds onto the front drive wheel. Therefore, the drive wheel always receives a clean surface for proper traction.

DETAILED DESCRIPTION OF THE INVENTION

Figure 1:
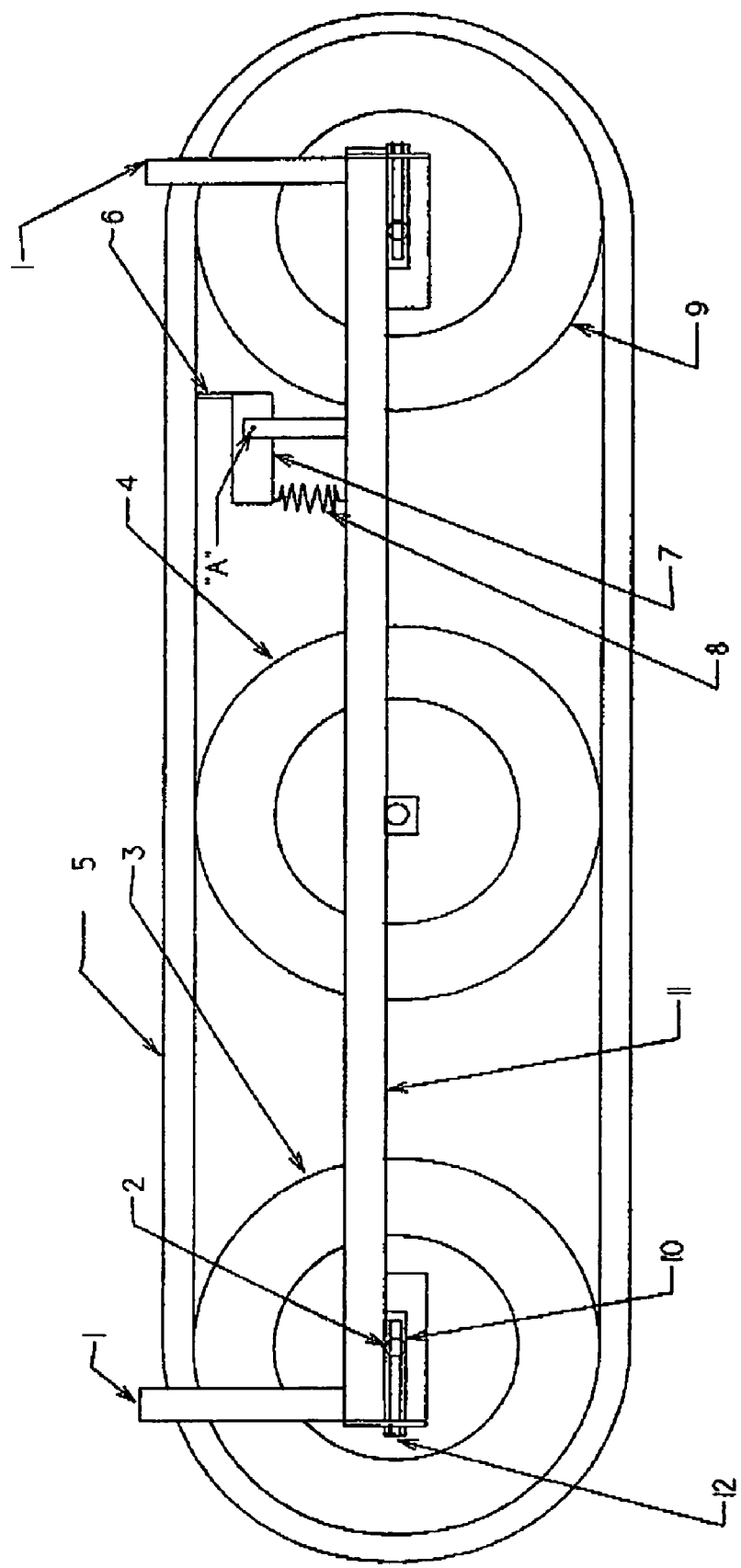
FIG. 1 is a side view of the track, its supporting frame, pneumatic tires, and the scraper.

Referring to FIG. 1, the axle 2 for the idler wheel 3 projects through the adjustment slot 10 on frame rail 11. The adjusting bolt 12 moves the axle 2 in the for/aft direction. This configuration is repeated on the opposite side of wheel 3 and the adjusting bolts can be adjusted independent of each other. The drive wheel 9 uses the same method for axle location adjustment. This allows the axles to be skewed as required to keep the center of track 5 aligned with the center of wheels 3 and 9 and not wander off center during operation in the absence of a side load. The bogey wheel 4 distributes vehicle weight evenly along the longitudinal length of the track 5. The brackets 1 support guide rollers that contact the sides of the track to limit the track offset from center. The scraper 6 is kept in contact with track 5 by virtue of the force applied by the tension spring 8 to the scraper arm 7 which pivots about point "A". The scraper 6 is located so that is contacts the under side of the upper run of track 5 to allow accumulated debris to fall off the scraper 6 due to gravity. This allows the drive wheel 9 to receive a clean surface for friction drive.

Figure 2:
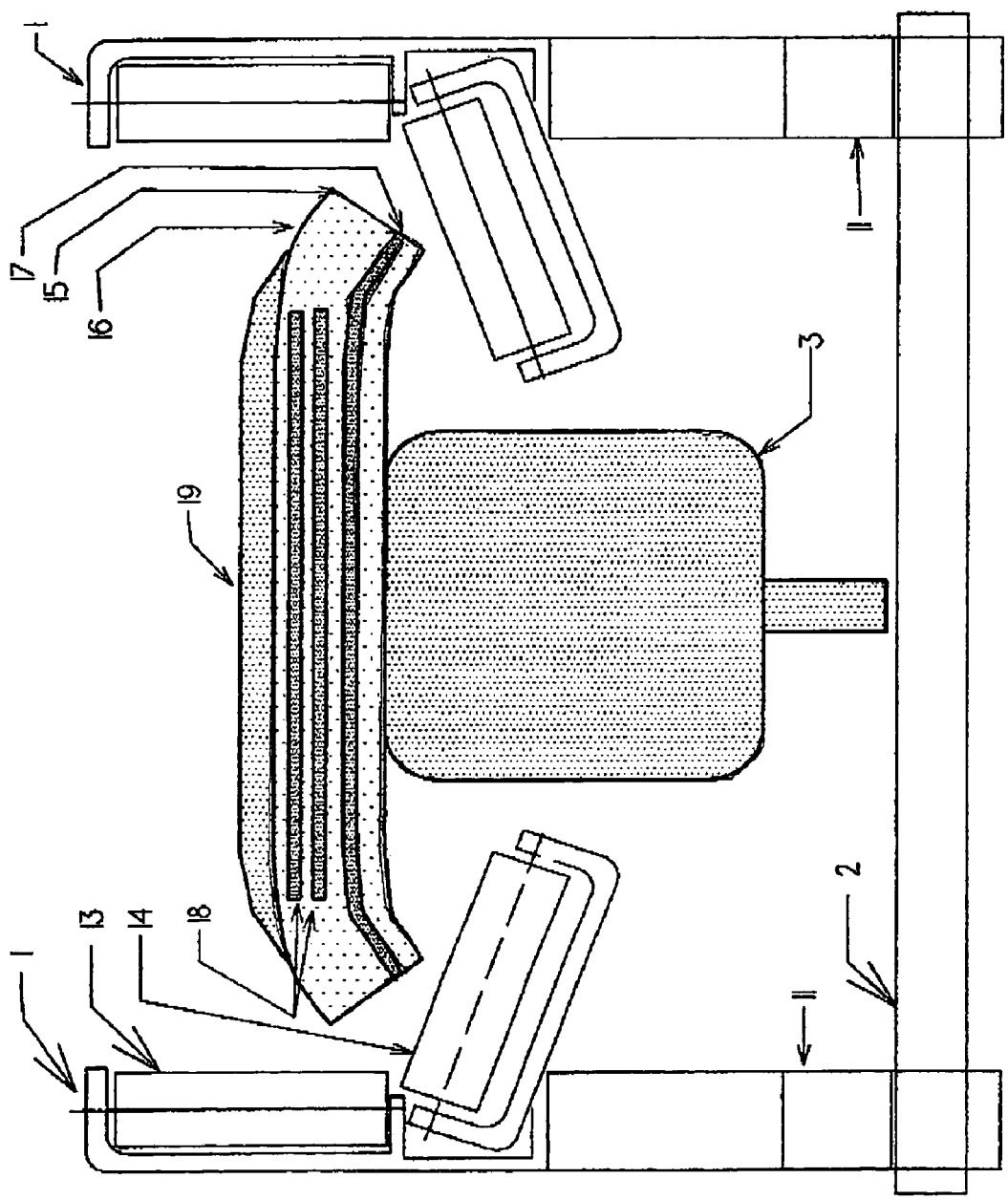
FIG. 2 is a cross sectional view of the track and a end view of the guide rollers.

FIG. 2 shows the location 15 of the cut that severs the tire casing 16 at the top of the sidewalls. This portion of the tire casing includes the reinforcing threads 17 and reinforcing belts 18 and becomes the track as disclosed herein and shown as item 5 in FIG. 1. The tire tread 19 may remain on the casing but it is not necessary. Guide rollers 13 and 14 are supported by brackets 1 and limit the track offset from center. They are spaced so that they are not in constant contact with the cut area 15 of the tire casing 16 when it is operating on-center. The axis of the angled guide roller 14 is set at approximately a 120 degree angle to the axis of the vertical guide roller 13 to keep the tire casing 16 from bending downward when it contacts the vertical guide roller 13.

Figure 3:
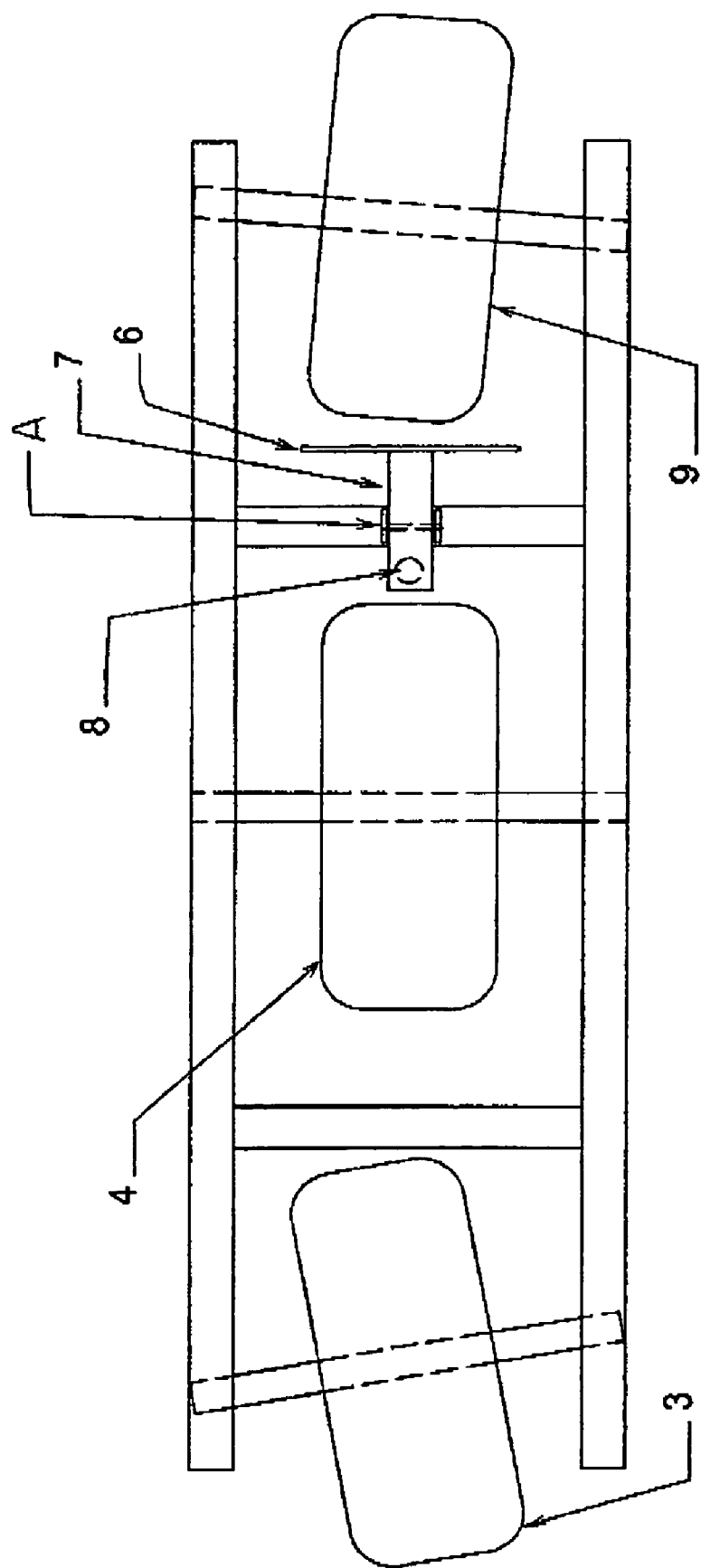
FIG. 3 is a top view of the pneumatic tires and axles in arbitrary skewed positions.

FIG. 3 shows the idler wheel 3 and the drive wheel 9 in skewed positions. It must be understood that the direction and magnitude of the skew angle for each wheel varies with every tire casing. The direction and magnitude can only be determined by testing. Note that the bogey wheel 4 is not skewed, its only function is to improve weight distribution on the track.

I claim:

1. An endless track constructed from a vehicle tire casing, comprising: each tire sidewall of a tire has been removed from the tire casing at the top of each sidewall, whereas a portion of the tire casing adjacent the tire tread then forms the endless track, wherein
said track is installed over two longitudinally disposed pneumatic tires mounted in a frame with the axles of said pneumatic tires skewed so that the plane of rotation of said pneumatic tires are oblique to each other resulting in said track running on-center in the absence of a side load.

2. An endless track as stated in claim 1 comprising:
a pair of guide rollers on each side of said track that limit the amount of off-center lateral displacement of said track in the presence of a side load,
the axis of first said guide roller is installed vertically and at a distance from the side of said tack so that there is clearance between said track and said first roller when said track is centered,
the axis of the second guide roller is installed at an angle substantially greater than 90 degrees, in a vertical plane, to the axis of the first said guide roller, to prevent the said track from deflecting downward when in contact with said first guide roller.

3. An endless track as stated in claim 1 comprising:
a spring loaded scraper which contacts the under side of the upper run of said track in combination with the front of said pneumatic tires applying frictional driving force to said track, said scraper operates perpendicular to the movement of said track.

* * * * *